Patented June 28, 1938

2,121,811

UNITED STATES PATENT OFFICE 2,121,811

AZO COMPOUNDS AND PROCESS FOR DYEING THEREWITH

James G. McNally and Joseph B. Dickey, Rochester, N. Y., assignors to Eastman Kodak Company, Rochester, N. Y., a corporation of New Jersey No Drawing. Application January 14, 1937, Serial No. 120,557

20 Claims. (Cl. 8—5)

This invention relates to aromatic azo compounds. More particularly, it relates to nuclear non-sulfonated aromatic azo compounds suitable for the coloration of organic derivatives of cellulose. The invention includes the azo compounds, the process for their preparation, the process of coloring with them and materials colored with the azo compounds of the invention.

Organic derivatives of cellulose are characterized by an indifferent affinity for the usual cotton or wool dyes, especially the ordinary water-soluble dyes. Typical organic derivatives of cellulose include the hydrolyzed as well as the unhydrolyzed cellulose organic acid esters, such as cellulose acetate, cellulose formate, cellulose propionate or cellulose butyrate, and the hydrolyzed as well as the unhydrolyzed mixed organic acid esters of cellulose, such as cellulose acetate-propionate, cellulose acetate-butyrate, and the cellulose ethers, such as methyl cellulose, ethyl cellulose or benzyl cellulose.

We have discovered that a valuable series of aromatic azo compounds can be obtained by coupling aromatic diazonium salts in an alkaline medium with compounds of the type represented by the formula:

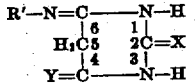

wherein X represents O or S, R' represents hydrogen, an alkyl group or an aryl group and Y represents O or NR'.

The compounds of our invention have the probable formula:

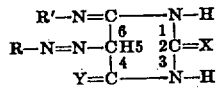

wherein R', X and Y have the meaning above given and R is an aromatic nucleus which may be substituted or unsubstituted. Advantageously, R is an aryl nucleus of the benzene series.

To avoid possible ambiguity, the barbituric nucleus has been numbered as indicated above. This numbering is followed throughout.

The aromatic azo compounds of our invention constitute a valuable class of dyes. Those which are nuclear non-sulfonated may be employed for the dyeing or coloration of organic derivatives of cellulose and produce dyeings thereon which are, in general, of good fastness to light and washing ranging in shade from yellow to red. The nuclear sulfonated compounds, which may be prepared by sulfonation of one of the unsulfonated compounds in known fashion, possess less or no utility for the coloration of organic derivatives of cellulose, but may be employed for coloring cotton, natural silk or wool by customary methods of application.

We have further discovered that the aryl azo compounds having a univalent non-metallic substituent on the aryl nucleus in ortho position to the azo group may be employed to advantage in the process of the invention as these compounds have been found to produce dyeings which are particularly good with respect to light fastness on organic derivatives of cellulose. Said univalent substituent may be an alkoxy group such as —OCH$_3$, —OC$_2$H$_5$ or —OCH$_2$CH$_2$CH$_3$, a nitro group, an —OC$_2$H$_4$OH group, an alkyl group such as methyl, ethyl or propyl, a halogen atom such as chlorine, bromine or fluorine, or an aryloxy group, such as phenoxy, for example.

Aryl azo barbituric and "substituted barbituric acid" compounds having a univalent non-metallic substituent on the aryl nucleus in ortho position to the azo group and their application for the dyeing or coloration of organic derivatives of cellulose are described and claimed in our copending application Serial No. 120,558, filed January 14, 1937. Reference should be made to said application for a more detailed description of ortho substituted aryl azo barbituric and "substituted barbituric acid" compounds.

The following examples illustrate the method of preparation of the azo compounds of our invention. Unless otherwise indicated, quantities are expressed in parts by weight.

Example 1

13.7 parts of o-phenetidine are dissolved in 200 parts of water containing about 36 parts of 36% hydrochloric acid. The resulting solution is cooled to a temperature approximating 0–5° C. by the addition of ice, for example, and diazotized by adding, with stirring, 6.9 parts of sodium nitrite dissolved in water.

12.7 parts of 6-iminobarbituric acid are dissolved in 300 parts of water containing 31.8 parts of sodium carbonate. The resulting solution is cooled and the diazo solution prepared above is added with stirring. Upon completion of the coupling reaction, the mixture is made slightly acid to litmus with acetic acid and the precipitated dye filtered, washed with water, and dried.

Example 2

16.8 parts of 2-methoxy-4-nitroaniline are added to 200 parts of water containing 36 parts of 36% hydrochloric acid. The mixture is iced and diazotized by adding, with stirring, 6.9 parts of sodium nitrite dissolved in water.

14 parts of 6-methyliminobarbituric acid are dissolved in 300 parts of water containing 31.8 parts of sodium carbonate and coupled in the usual manner with the diazo solution prepared as described above. When coupling is complete, the mixture is made slightly acid to litmus with acetic acid and the desired azo compound is recovered by filtration, washed with water, and dried.

Example 3

34.7 parts of disodium-2-aminonaphthalene-4,8-disulfonate are dissolved in 200 parts of water. The solution is well iced and then 59.5 parts of 36% hydrochloric acid are added with vigorous stirring. The resulting mixture is diazotized by the addition, with stirring, of 6.9 parts of sodium nitrite dissolved in water.

12.7 parts of 6-iminobarbituric acid are dissolved in 300 parts of water containing 31.8 parts of sodium carbonate. The solution is iced and the diazo solution prepared above slowly added while stirring. Upon completion of the coupling reaction, the desired azo compound is precipitated by the addition of sodium chloride, filtered, washed and dried.

This sulfonated dye compound is not suitable for coloring organic derivatives of cellulose, but may be employed for the coloration of cotton, natural silk or wool by customary methods of application.

Example 4

13.6 parts of p-aminodimethylaniline are dissolved in 200 parts of water containing about 47.6 parts of 36% hydrochloric acid. The resulting solution is cooled to a temperature approximating 0–5° C. by the addition of ice and diazotized in the usual manner by the addition of 6.9 parts of sodium nitrite dissolved in water.

12.7 parts of 6-iminobarbituric acid are dissolved in 300 parts of water containing 31.8 parts of sodium carbonate. The solution is iced, and the diazo solution prepared as described above is slowly added with stirring. When coupling is complete, the mixture is made slightly acid to litmus with acetic acid and the precipitated dye is filtered, washed with water and dried.

Example 5

16.8 parts of 2-methoxy-4-nitroaniline are added to 200 parts of water containing about 36 parts of 36% hydrochloric acid and the mixture is diazotized in the usual manner by the addition of 6.9 parts of sodium nitrite dissolved in water.

14.3 parts of 6-iminothiobarbituric acid are dissolved in 300 parts of water containing 31.8 parts of sodium carbonate and coupled in the usual manner with the diazo solution prepared above. Upon completion of the coupling reaction, the mixture is made slightly acid to litmus with acetic acid and the precipitated dye is filtered, washed with water and dried.

Example 6

17.3 parts of o-nitro-p-chloroaniline are diazotized in the usual manner.

14.3 parts of 6-iminobarbituric acid are dissolved in a cold dilute aqueous solution of sodium hydroxide and the diazo solution prepared above is added with stirring. When coupling is complete, the mixture is made acid to litmus with acetic acid, for example, and the precipitated dye compound is filtered, washed with water and dried.

Example 7

12.6 parts of 4,6-diiminobarbituric acid are dissolved in 300 parts of water and ice containing 31 parts of sodium carbonate and the diazo solution prepared in Example 1 is added with stirring. When coupling is complete the mixture is made acid to litmus with acetic acid and the precipitated dye is recovered by filtration, washed and dried.

Example 8

13.5 parts of p-aminoacetophenone are dissolved in 200 cc. of water containing 25 cc. of 36% hydrochloric acid and diazotized in the usual manner by the addition of 6.9 parts of sodium nitrite.

14.2 parts of 4,6-diiminothiobarbituric acid are dissolved in 300 cc. of water containing 30 parts of sodium carbonate. The resulting solution is cooled and the diazo solution prepared above is slowly added with stirring. Upon completion of the coupling reaction, the mixture is made acid to litmus with acetic acid and the precipitated dye is recovered by filtration, washed with water and dried.

Example 9

20.7 parts of 2,6-dichloro-4-nitroaniline are dissolved in 55 parts of 100% sulfuric acid and the resulting solution cooled. This solution is then mixed with a cold solution of 6.9 parts of sodium nitrite in 37 parts of 100% sulfuric acid. The resulting solution is further cooled externally and diluted by the addition of 105 parts of glacial acetic acid and cooled to 15° C. The mixture is stirred several hours until the diazotization is complete and then added to 12.7 parts of 6-iminobarbituric acid dissolved in 105 parts of glacial acetic acid. Sodium acetate is then added until the sulfuric acid present is neutralized. When coupling is complete, the dye is precipitated by adding water, filtered, washed and dried.

In order that our invention may be more fully understood, the preparation of a number of substances employed in the manufacture of the azo compounds of the invention is described hereinafter.

Preparation of 6-iminobarbituric acid 4.6 grams of sodium are dissolved in 100 cc. of absolute ethanol and 11.3 grams of ethyl cyano acetate and 6.5 grams of urea are added. The mixture is heated at 70–80° C. for about 5 hours and the sodium salt resulting is filtered, washed with alcohol and dissolved in a minimum amount of water. 6-iminobarbituric acid is precipitated by adding hydrochloric acid to the aqueous solution of its sodium salt until the solution is acid to Congo red paper, recovered by filtration, washed with water and dried.

Preparation of 6-iminothiobarbituric acid

This compound is prepared in the same manner as 6-iminobarbituric acid, except that an equivalent amount of thiourea is substituted for urea. Further, the preparation of 6-iminothiobarbituric acid is described in Liebig's Annalen, vol. 331, page 67 (1904) and Berichte der Deutschen Chemischen Gesellschaft, vol. 33, page 1374 (1900).

*Preparation of 4,6-diiminothiobarbituric acid*

This compound may be prepared as described in Liebig's Annalen, vol. 331, page 80 (1904).

The following tabulation further illustrates the compounds included within the scope of our invention, together with the color they produce on cellulose acetate silk. The compounds indicated below may be prepared by diazotizing the amines listed under the heading "Amine" and coupling with the compounds specified in the column entitled "Developer". The diazotization and coupling reactions may be carried out in accordance with the general procedure disclosed in Examples 1–9, inclusive.

| Coupling component | Amine | Color on cellulose acetate silk |
|---|---|---|
| 6-iminobarbituric acid | o-Anisidine | Greenish yellow. |
| 6-alkyliminobarbituric acid | do | Do. |
| 6-iminothiobarbituric acid | do | Golden yellow. |
| 6-iminobarbituric acid | p-Anisidine | Greenish yellow. |
| 6-alkyliminobarbituric acid | do | Do. |
| 6-iminothiobarbituric acid | do | Golden yellow. |
| 6-iminobarbituric acid | o-Chloroaniline | Greenish yellow. |
| 6-alkyliminobarbituric acid | do | Do. |
| 6-iminothiobarbituric acid | do | Golden yellow. |
| 6-iminobarbituric acid | p-Aminodimethylaniline | Red. |
| 6-alkyliminobarbituric acid | do | Do. |
| 6-iminothiobarbituric acid | do | Do. |
| 6-iminobarbituric acid | p-Nitroaniline | Golden yellow. |
| 6-alkyliminobarbituric acid | do | Do. |
| 6-iminothiobarbituric acid | do | Do. |
| 6-iminobarbituric acid | o-Methoxy-p-nitroaniline | Do. |
| 6-alkyliminobarbituric acid | do | Do. |
| 6-iminothiobarbituric acid | do | Do. |
| 6-iminobarbituric acid | o-β-hydroxy ethoxy aniline | Orange yellow. |
| 6-iminobarbituric acid | o-Nitroaniline | Golden yellow. |
| 6-methyliminobarbituric acid | do | Do. |
| 6-iminothiobarbituric acid | do | Do. |
| 6-methyliminothiobarbituric acid | do | Do. |
| 6-iminobarbituric acid | o-Nitro-p-chloroaniline | Do. |
| 6-methyliminobarbituric acid | do | Do. |
| 6-iminothiobarbituric acid | do | Do. |
| 6-methyliminothiobarbituric acid | do | Do. |
| 6-iminobarbituric acid | 2-nitro-4, 6-dichloroaniline | Do. |
| 6-methyliminobarbituric acid | do | Do. |
| 6-iminothiobarbituric acid | do | Do. |
| 6-methyliminothiobarbituric acid | do | Do. |
| 6-iminobarbituric acid | 2, 6-dinitro-4-chloroaniline | Do. |
| 6-methyliminobarbituric acid | do | Do. |
| 6-iminothiobarbituric acid | do | Do. |
| 6-methyliminothiobarbituric acid | do | Do. |
| 6-iminobarbituric acid | o-Nitro-p-alkylaniline | Do. |
| 6-methyliminobarbituric acid | do | Do. |
| 6-iminothiobarbituric acid | do | Do. |
| 6-methyliminothiobarbituric acid | do | Do. |
| 6-iminobarbituric acid | o-Nitro-p-alkoxyaniline | Do. |
| 6-methyliminobarbituric acid | do | Do. |
| 6-iminothiobarbituric acid | do | Do. |
| 6-methyliminothiobarbituric acid | do | Do. |
| 6-iminobarbituric acid | 2-Nitro-1-amino-4-phenylmethylsulfone | Do. |
| 6-methyliminobarbituric acid | do | Do. |
| 6-iminothiobarbituric acid | do | Do. |
| 6-methyliminothiobarbituric acid | do | Do. |
| 4, 6-diiminobarbituric acid | o-Anisidine | Yellow. |
| Do | m-Anisidine | Do. |
| Do | p-Anisidine | Do. |
| Do | o-Chloroaniline | Do. |
| Do | m-Chloroaniline | Do. |
| Do | p-Chloroaniline | Do. |
| Do | o-Bromoaniline | Orange yellow. |
| Do | m-Bromoaniline | Do. |
| Do | p-Bromoaniline | Do. |
| Do | o-Toluidine | Yellow. |
| Do | m-Toluidine | Do. |
| Do | p-Toluidine | Do. |
| Do | 2, 4-dichloroaniline | Do. |
| Do | 2, 5-dichloroaniline | Orange yellow. |
| Do | o-Nitro-p-chloroaniline | Do. |
| Do | 4-Nitro-2-methoxyaniline | Do. |
| Do | p-Aminoacetophenone | Yellow. |
| Do | 2-methyl-4-nitroaniline | Orange yellow. |
| Do | 3-nitro-4-aminotoluene | Do. |
| Do | 1-amino-3-nitro-4-methyl benzene | Do. |
| 4, 6-diiminothiobarbituric acid | o-Anisidine | Do. |
| Do | m-Anisidine | Do. |
| Do | p-Anisidine | Do. |
| Do | o-Chloroaniline | Do. |
| Do | m-Chloroaniline | Do. |
| Do | p-Chloroaniline | Do. |
| Do | o-Bromoaniline | Do. |
| Do | m-Bromoaniline | Do. |
| Do | p-Bromoaniline | Do. |
| Do | o-Toluidine | Do. |
| Do | m-Toluidine | Do. |
| Do | p-Toluidine | Do. |
| Do | 2, 4-dichloroaniline | Yellow. |
| Do | 2, 5-dichloroaniline | Orange yellow. |
| Do | o-Nitro-p-chloroaniline | Do. |
| Do | 4-nitro-2-methoxyaniline | Do. |
| Do | p-Aminoacetophenone | Do. |
| Do | 2-methyl-4-nitroaniline | Do. |
| Do | 3-nitro-4-aminotoluene | Do. |
| Do | 1-amino-3-nitro-4-methyl benzene | Do. |
| 6-iminobarbituric acid | m-Anisidine | Yellow. |
| Do | p-Anisidine | Do. |
| Do | m-Chloroaniline | Do. |
| Do | p-Chloroaniline | Do. |
| Do | o-Bromoaniline | Do. |
| Do | m-Bromoaniline | Do. |
| Do | p-Bromoaniline | Do. |
| Do | o-Toluidine | Do. |
| Do | m-Toluidine | Do. |

| Coupling component | Amine | Color on cellulose acetate silk |
|---|---|---|
| 6-iminobarbituric acid | p-Toluidine | Yellow. |
| Do | 2,4-dichloroaniline | Do. |
| Do | 2,5-dichloroaniline | Do. |
| Do | o-Nitro-p-Chloroaniline | Orange yellow. |
| Do | 4-nitro-2-methoxyaniline | Do. |
| Do | p-Aminoacetophenone | Yellow. |
| Do | 2-methyl-4-nitroaniline | Orange yellow. |
| Do | 3-nitro-4-aminotoluene | Do. |
| Do | 1-amino-3-nitro-4-methyl benzene | Do. |
| 2,4-diiminobarbituric acid | o-Anisidine | Yellow. |
| Do | m-Anisidine | Do. |
| Do | p-Anisidine | Do. |
| Do | o-Chloroaniline | Do. |
| Do | m-Chloroaniline | Do. |
| Do | p-Chloroaniline | Do. |
| Do | o-Bromoaniline | Do. |
| Do | m-Bromoaniline | Do. |
| Do | p-Bromoaniline | Do. |
| Do | o-Toluidine | Do. |
| Do | m-Toluidine | Do. |
| Do | p-Toluidine | Do. |
| Do | 2,4-dichloroaniline | Do. |
| Do | 2,5-dichloroaniline | Do. |
| Do | o-Nitro-p-chloroaniline | Do. |
| Do | 4-nitro-2-methoxyaniline | Do. |
| Do | p-Aminoacetophenone | Do. |
| Do | 2-methyl-4-nitroaniline | Orange yellow. |
| Do | 3-nitro-4-aminotoluene | Do. |
| Do | 1-amino-3-nitro-4-methyl benzene | Do. |

In employing the aromatic azo derivatives of our invention as dyes, they will ordinarily be applied to the material in the form of an aqueous suspension which can be prepared by grinding the dye to a paste in the presence of a sulfonated oil, soap, or other suitable dispersing agent and dispersing the resulting paste in water. Dyeing operations can, with advantage, be conducted at a temperature of 80-85° C., but any suitable temperature may be used. In accordance with the usual dyeing practice, the material to be dyed will ordinarily be added to the aqueous dye bath at a temperature lower than that at which the main portion of the dyeing is to be effected, a temperature approximating 45-45° C., for example, following which the temperature of the dye bath will be raised to that selected for carrying out the dyeing operation. The temperature at which the dyeing is conducted will vary somewhat, depending, for example, on the particular material or materials undergoing coloration.

The amount of dispersing agent employed may be varied over wide limits. Amounts approximating 10 to 200% by weight on the dye may be employed, for example. These amounts are not to be taken as limits as greater or lesser amounts can be used. To illustrate, if the dye is ground to a sufficiently fine powder dyeing can be satisfactorily carried out without the aid of a dispersing agent. Generally speaking, however, the use of a dispersing agent is desirable.

Advantageously, dyeing is carried out in a substantially neutral dyebath. Perhaps, more accurately, it should be stated that dyeing should not be carried out in an alkaline dyebath, that is, one having any subsantial alkalinity, since the presence of free alkali appears to affect the dyeing adversely. Dyeing in an acid dyebath is not recommended because of the tendency of acids to affect the material undergoing dyeing adversely. Because of these considerations when a dispersing agent is to be employed preferably it is neutral or substantially neutral.

It will be understood that the azo compounds of our invention may be applied to the material to be colored in any suitable manner. Coloration may be effected, for example, by dyeing, printing, or stenciling. Dispersing or solubilizing agents that can be employed for preparing suspensions of the dye include soap, sulphoricinoleic acid, salts of sulphoricinoleic acid, a water soluble salt of cellulose phthalate, cellulose succinate or cellulose mono-acetate diphthalate, for example, the sodium, potassium or ammonium salts, and sulfonated oleic, stearic or palmitic acid, or salts thereof, such, for example, as the sodium or ammonium salts.

While it is preferred to effect coloration by applying the dye compound from an aqueous dye bath directly to the material to be colored, the azo compounds of our invention may be applied employing the methods applicable to the so-called ice colors. Briefly, in accordance with this method of dyeing, the amine is absorbed and diazotized on the fiber, after which the dye is formed in situ by developing with 6-iminobarbituric acid or its derivatives indicated herein. Conversely, the material undergoing dyeing may first be treated to absorb 6-iminobarbituric acid or its derivatives indicated herein and the dye subsequently formed in situ by coupling with an aryl diazonium salt.

The following example illustrates one satisfactory way in which dyeing may be carried out in accordance with our invention. Quantities are expressed in parts by weight.

*Example 10*

2.5 parts of the dye compound formed by coupling diazotized o-anisidine with 6-iminobarbituric acid in an alkaline medium are finely ground with soap and dispersed in 1000 parts of water. The dispersion thus prepared is heated to a temperature approximating 45-55° C. and 100 parts of cellulose acetate silk, in the form of taffeta or threads, for example, are added to the dye bath, after which the temperature is gradually raised to 80-85° C. and the silk worked for several hours at this latter temperature. Upon completion of the dyeing operation, the cellulose acetate silk is removed, washed with soap, rinsed and dried. The cellulose acetate silk is dyed a greenish-yellow shade.

While our invention has been illustrated in connection with the dyeing of cellulose acetate silk, it will be understood that dyeing operations can be carried out in a manner similar to that described above by the substitution of another organic derivative of cellulose material for cellulose acetate silk or by employing a dye compound of the invention other than that employed in the example, or by substitution of both the material being dyed and the dye compound of the example.

We claim:

1. An azo compound having the general formula:

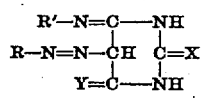

wherein X represents O or S, R' represents hydrogen, an alkyl group or an aryl group, Y represents O or NR' and R represents an aromatic nucleus.

2. An azo compound having the general formula:

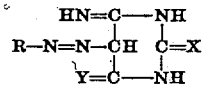

wherein X represents O or S, Y represents O or NH and R represents an aromatic nucleus.

3. An azo compound having the general formula:

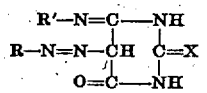

wherein X represents O or S, R' represents an alkyl group and R represents an aryl nucleus of the benzene series.

4. An azo compound having the general formula:

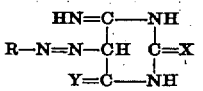

wherein X represents O or S, Y represents O or NH and R represents a nuclear non-sulfonated aryl nucleus of the benzene series.

5. An azo compound having the general formula:

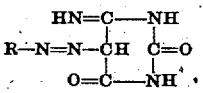

wherein R represents an aryl nucleus of the benzene series.

6. An azo compound having the general formula:

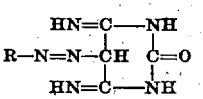

wherein R represents an aryl nucleus of the benzene series.

7. A process of coloring an organic derivative of cellulose which comprises applying thereto a dye selected from the class of azo compounds having the general formula:

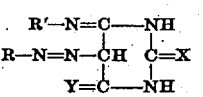

wherein X represents O or S, R' represents hydrogen, an alkyl group or an aryl group, Y represents O or NR' and R represents a nuclear non-sulfonated aromatic nucleus.

8. A process of coloring an organic derivative of cellulose which comprises applying thereto a dye selected from the class of azo compounds having the general formula:

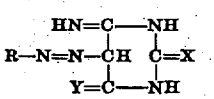

wherein X represents O or S, Y represents O or NH and R represents a nuclear non-sulfonated aryl nucleus of the benzene series.

9. A process of coloring an organic acid ester of cellulose which comprises applying thereto a dye selected from the class of azo compounds having the general formula:

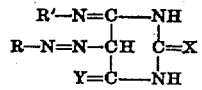

wherein X represents O or S, R' represents hydrogen, an alkyl group or an aryl group, Y represents O or NR' and R represents a nuclear non-sulfonated aromatic nucleus.

10. A process of coloring an organic acid ester of cellulose which comprises applying thereto a dye selected from the class of azo compounds having the general formula:

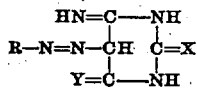

wherein X represents O or S, Y represents O or NH and R represents a nuclear non-sulfonated aryl nucleus of the benzene series.

11. A process of coloring a cellulose acetate which comprises applying thereto a dye selected from the class of azo compounds having the general formula:

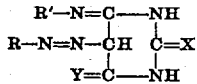

wherein X represents O or S, R' represents hydrogen, an alkyl group or an aryl group, Y represents O or NR' and R represents a nuclear non-sulfonated aromatic nucleus.

12. A process of coloring a cellulose acetate which comprises applying thereto a dye selected from the class of azo compounds having the general formula:

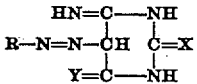

wherein X represents O or S, Y represents O or NH and R represents a nuclear non-sulfonated aryl nucleus of the benzene series.

13. Material made of or comprising an organic derivative of cellulose colored with a dye selected from the class of azo compounds having the general formula:

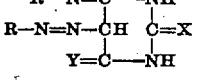

wherein X represents O or S, R' represents hydrogen, an alkyl group or an aryl group, Y represents O or NR' and R represents a nuclear non-sulfonated aromatic nucleus.

14. Material made or comprising an organic derivative of cellulose colored with a dye selected from the class of azo compounds having the general formula:

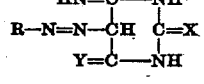

wherein X represents O or S, Y represents O or NH and R represents a nuclear non-sulfonated aryl nucleus of the benzene series.

15. Material made of or comprising an organic acid ester of cellulose colored with a dye selected from the class of azo compounds having the general formula:

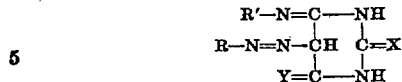

wherein X represents O or S, R' represents hydrogen, an alkyl group or an aryl group, Y represents O or NR' and R represents a nuclear non-sulfonated aromatic nucleus.

16. Material made of or comprising an organic acid ester of cellulose colored with a dye selected from the class of azo compounds having the general formula:

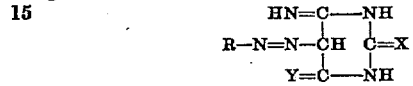

wherein X represents O or S, Y represents O or NH and R represents a nuclear non-sulfonated aryl nucleus of the benzene series.

17. A cellulose acetate colored with a dye selected from the class of azo compounds having the general formula:

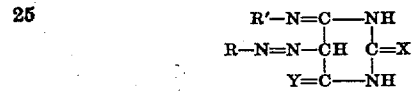

wherein X represents O or S, R' represents hydrogen, an alkyl group or an aryl group, Y represents O or NR' and R represents a nuclear non-sulfonated aromatic nucleus.

18. A cellulose acetate colored with a dye selected from the class of azo compounds having the general formula:

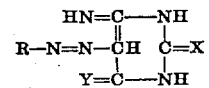

wherein X represents O or S, Y represents O or NH and R represents a nuclear non-sulfonated aryl nucleus of the benzene series.

19. A cellulose acetate colored with a dye selected from the class of azo compounds having the general formula:

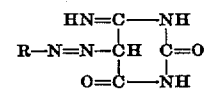

wherein R represents a nuclear non-sulfonated aryl nucleus of the benzene series.

20. A cellulose acetate colored with a dye selected from the class of azo compounds having the general formula:

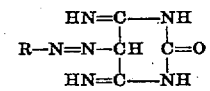

wherein R represents a nuclear non-sulfonated aryl nucleus of the benzene series.

JAMES G. McNALLY.
JOSEPH B. DICKEY.

Certificate of Correction

Patent No. 2,121,811.     June 28, 1938.

JAMES G. McNALLY ET AL.

It is hereby certified that error appears in the printed specification of the above numbered patent requiring correction as follows: Page 6, second column, lines 4 to 7 inclusive, claim 18, for that portion of the formula reading "$\overset{\text{"C"}}{\underset{CH}{\|}}$" read $\overset{C}{\underset{CH}{|}}$; and that the said Letters Patent should be read with this correction therein that the same may conform to the record of the case in the Patent Office.

Signed and sealed this 9th day of August, A. D. 1938.

Leslie Frazer

[SEAL]

*Acting Commissioner of Patents.* from the class of azo compounds having the general formula:

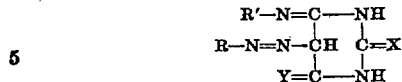

wherein X represents O or S, R' represents hydrogen, an alkyl group or an aryl group, Y represents O or NR' and R represents a nuclear non-sulfonated aromatic nucleus.

16. Material made of or comprising an organic acid ester of cellulose colored with a dye selected from the class of azo compounds having the general formula:

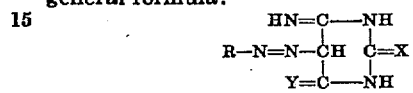

wherein X represents O or S, Y represents O or NH and R represents a nuclear non-sulfonated aryl nucleus of the benzene series.

17. A cellulose acetate colored with a dye selected from the class of azo compounds having the general formula:

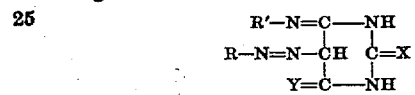

wherein X represents O or S, R' represents hydrogen, an alkyl group or an aryl group, Y represents O or NR' and R represents a nuclear non-sulfonated aromatic nucleus.

18. A cellulose acetate colored with a dye selected from the class of azo compounds having the general formula:

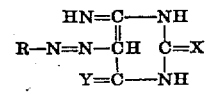

wherein X represents O or S, Y represents O or NH and R represents a nuclear non-sulfonated aryl nucleus of the benzene series.

19. A cellulose acetate colored with a dye selected from the class of azo compounds having the general formula:

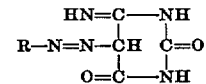

wherein R represents a nuclear non-sulfonated aryl nucleus of the benzene series.

20. A cellulose acetate colored with a dye selected from the class of azo compounds having the general formula:

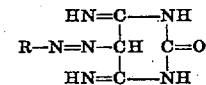

wherein R represents a nuclear non-sulfonated aryl nucleus of the benzene series.

JAMES G. McNALLY.
JOSEPH B. DICKEY.

Certificate of Correction

Patent No. 2,121,811.            June 28, 1938.

JAMES G. McNALLY ET AL.

It is hereby certified that error appears in the printed specification of the above numbered patent requiring correction as follows: Page 6, second column, lines 4 to 7 inclusive, claim 18, for that portion of the formula reading "$\overset{\text{"C"}}{\underset{CH}{\|}}$" read $\overset{C}{\underset{CH}{|}}$; and that the said Letters Patent should be read with this correction therein that the same may conform to the record of the case in the Patent Office.

Signed and sealed this 9th day of August, A. D. 1938.

[SEAL]

Leslie Frazer

*Acting Commissioner of Patents.*

Certificate of Correction

Patent No. 2,121,811.     June 28, 1938.

JAMES G. McNALLY ET AL.

It is hereby certified that error appears in the printed specification of the above numbered patent requiring correction as follows: Page 6, second column, lines 4 to 7 inclusive, claim 18, for that portion of the formula reading $\overset{\text{``C''}}{\underset{\text{CH}}{\|}}$ read $\overset{\text{C}}{\underset{\text{CH}}{|}}$; and that the said Letters Patent should be read with this correction therein that the same may conform to the record of the case in the Patent Office.

Signed and sealed this 9th day of August, A. D. 1938.

Leslie Frazer

[SEAL]

*Acting Commissioner of Patents.*